United States Patent Office 2,965,640
Patented Dec. 20, 1960

2,965,640

16-N-SUBSTITUTED STEROIDS AND PROCESS FOR MANUFACTURING SAME

Emanuel B. Hershberg, West Orange, and David H. Gould, Leonia, N.J., assignors to Schering Corporation, Bloomfield, N.J., a corporation of New Jersey No Drawing. Filed Dec. 12, 1955, Ser. No. 552,266

15 Claims. (Cl. 260—239.5)

The present invention relates to the preparation of 16-heterocyclically substituted steroids, wherein the 16-carbon of the steriod molecule is linked to the heterocycle through a nitrogen atom forming part of the heterocyclic ring, and of their acid addition salts and quaternary ammonium salts.

More particularly, the invention relates to the manufacture of nuclearly saturated and unsaturated steroids having the pregnane carbon skeleton and substituted at the 16-position by a saturated cyclic amine by way of the ring nitrogen, and to the products so obtained.

The present application is a continuation-in-part of our co-pending applications Serial No. 226,941, filed May 17, 1951, now abandoned, and Serial No. 282,904, filed April 17, 1952, now abandoned.

The preferred compounds of the present invention are saturated and unsaturated pregnanes having hydroxyl or ketonic oxygen at the 3- and 20-positions, which may be substituted or not at $C_{21}$, and in the absence of a double bond attached to the 5-carbon, the A and B rings may have the normal or allo-configuration. These compounds are represented by the following formula:

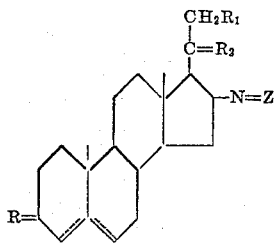

wherein
R represents O; H,OH; H,O-acyl; or H,glucosidyl or other sugar group;
$R_1$ is H; OH; or O-acyl;
$R_2$ is O; or H,OH; and
N=Z is a saturated heterocyclic 5- or 6-membered ring including the nitrogen indicated in the formula and through which the heterocycle is directly linked to the 16-carbon of the steroid molecule, the remaining atoms of the ring being all carbon, or carbon together with oxygen, sulfur or additional nitrogen; the dotted lines indicating the preferred position of a double bond when one is present, but a double bond may be alternatively or additionally present at one or more of the 6,7; 7,8; 9,11; and 11,12-positions.

The acyl groups may be aliphatic or aryl, and preferably have from 1 to 9 carbon atoms, such as the lower alkanoyl groups like formyl, acetyl, propionyl, butyryl, isobutyryl, methyl ethyl acetyl, isovaleryl, cyclopentyl- and cyclohexyl-acetyl and propionyl; succinyl, tartaryl, tiglyl; benzoyl, veratroyl, phthalyl, and the like.

In the case of compounds having a double bond attached to the 5-carbon, such double bond will extend to the 4- or 6-carbon, depending upon the substitutent in the 3-position; thus, when the 3-substitutent is ketonic oxygen, the double bond links the 4,5-carbons; while if the 3-substitutent is an hydroxyl or ester group, the double bond will run from the 5- to the 6-carbon. In the absence of a double bond attached to the 5-carbon, the A and B rings may be either of the normal or allo-configuration.

Examples of the saturated nitrogen-containing heterocycles embraced by the present invention include piperidine, pyrrolidine, morpholine, piperazine, 1,3-hexahydrodiazine, 1,3- and 1,4-oxazylidines (tetrahydrooxazines), oxazolidines, 1,3-thiazolidine, and the lower alkyl, and especially methyl, substitution products of these heterocycles, and particularly the various isomeric pipercolines, such as the β- and gamma-pipecolines.

The present invention providees steroids substituted at $C_{16}$ and related to natural pharmaco-dynamic steriods likewise substituted at $C_{16}$. Furthermore, by the process of the invention, we can add substitutents which themselves are known in the synthetic medicinal field to have physiological activity. These groups, combined with steriod nuclei which are closely involved in the life and functioning of animal tissues, yield pharmacologically valuable compounds.

The compounds of the present invention are effective in the control of hypertension, being active on the cardiovascular system, and operating as cardiac sedatives and motor depressants. They can be administered by injection in the form of solutions or by mouth in the form of tablets containing the usual non-toxic carriers, like starches, sugars, gums, etc. The solutions may be in water or non-toxic polyhydric alcohols like ethylene and propylene glycols, glycerine, and the like, or in dextran, the liquid carbowaxes etc.; and the compounds may be in the form of their acid addition or quaternary ammonium salts.

The compounds of the invention are alkaloid-like in nature and are distinguished over the veratrum alkaloids by a considerably higher therapeutic ratio and diminished, or substantially absent, side effects. They can be administered in a dosage of about 5 to about 100 mg. per day.

The compounds of the invention may have further substituents at various points in the molecule in addition to those indicated in the structural formula presented hereinabove. Thus, a hydroxyl or ketonic oxygen may be attached to one or more of the 1, 6, 11 and 12-carbons; and the hydroxyl group may be acylated with any suitable acid such as those named hereinabove. A hydroxyl group may also be present at one of the 5- and 6-positions, or an oxygen atom may join these carbons.

The ring nitrogen which becomes linked to the 16-carbon of the steroid molecule, is originally secondary in character and becomes tertiary when such linkage is effected in accordance with the invention. The cyclic amine-substituted steroids can be converted in known manner into their inorganic and organic acid addition salts like the hydrochlorides, sulfates, bitartrates, maleates, succinates, and other salts of acids which are non-toxic in dosages in which the compounds are administered. The compounds can also be converted into quaternary ammonium salts by treatment with lower alkyl or aryl halides, like methyl, ethyl, propyl, butyl and benzyl iodides, bromides, and in some cases, also chlorides.

The free hydroxyl groups of the products of the present invention can be esterified after the substitution at the 16-position; and if desired, a double bond present in the molecule or the 20-keto group may be selectively or jointly reduced to saturate the steroid molecule and/or convert the 20-keto group into a secondary hydroxyl group. If only the 3-hydroxyl of a 3,20 diol compound of the invention is to be esterified, such esterification is conducted prior to the reduction of the 20-keto group. Where the starting compound has an ester group in the 3- and/or 21-position, such ester will generally be hydrolyzed in the course of the addition of a 16-substituent, so that re-esterification becomes necessary if esters are desired.

When the process of the invention is carried out in the presence of a basic catalyst, a glycosidyl group at the 3-position will be retained, as it is stable to bases.

The compounds of the invention can be readily prepared by reacting the corresponding 20-keto-16-dehydropregnane with the free cyclic amine in the presence of an acid or basic catalyst. The starting compound may, for example, be a 20-keto-$\Delta^{16}$-pregnene or a 20-keto-$\Delta^{5,16}$-pregnadiene compound; and in the latter case, the resulting 16-substituted $\Delta^5$-pregnene compound can be hydrogenated in known manner to saturate the same. In the case of 16-substituted $\Delta^5$-pregnen-20-ones, the 20-keto group can be selectively reduced, as with an alkali metal borohydride; or the double bond can be selectively reduced, as with hydrogen in the presence of palladium catalyst, while leaving the 20-keto group unchanged.

The process is carried out by simply mixing the 20-keto-16-dehydro pregnane with the cyclic amine in a suitable solvent in the presence of an acid or basic catalyst. The reaction can be conducted at room temperature or with heating on a water or steam bath. The cyclic amine is thereby added across the 16,17-double bond, hydrogen being added at the 17-carbon while the heterocycle becomes linked to the 16-carbon through the nitrogen.

Among the acid catalysts that may be used are hydrochloric, sulfuric, acetic, p-toluene sulfonic, and other acids which will not attack the steroid molecule. The basic catalysts that can be employed may likewise be inorganic or organic, and include the alkali metal hydroxides, particularly sodium and potassium hydroxides, and strong organic bases which are non-reactive toward the steroid, such as the quaternary ammonium bases, like benzyltrimethylammonium hydroxide and choline. There may also be used a hydroxyl form of anion-exchange resin.

The preparation of various compounds of the invention is described in detail in the following examples which are presented for purposes of illustration only and not as indicating the limits of the invention:

EXAMPLE 1

16-piperazinopregnenolone 5,16-pregnadienolone (10 g.) is warmed in 200 ml. of piperazine hexahydrate and treated with 4 g. of KOH in 20 ml. of water. The mixture is stirred on the steam bath for two days, and poured into water. The crude precipitate is dissolved in acetic acid, diluted with 10 volumes of water, filtered, and the filtrate neutralized. The product is crystallized from ethylacetate, M.P. 250–252°.

EXAMPLE 2

16-($\gamma$-methyl-piperidino) allopregnanolone

Two grams of 16-allopregnen-3$\beta$-ol-20-one dissolved in 3500 of dioxane, are treated with 0.5 g. KOH in 15 cc. of water and 5 cc. of $\gamma$-methyl-piperidine are added. The mixture is stirred 6 hours and let stand overnight. On concentration, the solution precipitates crystalline 16-($\gamma$-methyl-piperidino)-allopregnanolone. The infrared spectrum confirms the structure.

EXAMPLE 3

16-pyrrolidino pregnenolone

A solution of 2 g. of 16-dehydro-pregnenolone acetate in 35 cc. dioxane is treated with 0.5 g. KOH in water and 5 cc. of pyrrolidine are added. The mixture is stirred for 12 hours and concentrated. On chilling, crystals of 16-pyrrolidino pregnenolone are obtained, M.P. 145–7°. The structure is confirmed by the infra-red spectrum.

EXAMPLE 4

16-(N-piperidino) pregnenolone

One gram of 5,16-pregnadien-3$\beta$-ol-20-one acetate is dissolved in 4 ml. of piperidine and treated with 0.25 g. of KOH in 0.3 ml. of distilled water. The mixture is heated with stirring for 1 hr., then stirred over night at room temperature.

The solution is poured into 100 ml. of water and the precipitate is filtered off and dried. The product after crystallization from ethylacetate is 16-(N-piperidino) pregnenolone; M.P. 149–151°.

EXAMPLE 5

16-(N-$\beta$-pipecolino) pregnenolone

Ten grams of 16-dehydropregnenolone are dissolved in 100 ml. of tetrahydrofuran and 50 ml. of $\beta$-pipecoline. To this are added 5 ml. of 50% choline in methanol. The mixture is allowed to stand for 12 hours and then filtered into water. The precipitate is filtered off and dried. The crude product is a mixture of isomers of 16-(N-$\beta$-pipecolino) pregnenolone which may be separated by crystallization from hexane. They may also be separated by crystallization from the methanolic acetone solution of the hydrochlorides, M.P. 215–217° (dec.) and 222–226° (dec.) obtained by treating the methanol-acetone solution of the mixture with hydrochloric acid (aqueous or gaseous). The free bases are regenerated by treatment with one equivalent of sodium carbonate or hydroxide.

EXAMPLE 6

16-(N-morpholino) pregnenolone 16-dehydropregnenolone acetate is treated with 5 ml. of morpholine in 10 ml. of dioxane and 0.25 g. of KOH in 0.3 ml. of distilled water. The mixture is heated with stirring for one hour and stirring is continued over night. The mixture is concentrated in vacuo at not over 40° C. and poured into water. The precipitated 16-(N-morpholino) pregnenolone is filtered off and dried in vacuo. It may be recrystallized from hexanebenzene, M.P. 180–181°. The structure is confirmed by the infrared spectrum.

EXAMPLE 7

16-(N-piperidino) pregnenolone bitartrate

One gram of the product from Example 4 is dissolved in 15 ml. of acetone, and the solution is clarified by filtration. To it is added 0.393 g., of d-tartaric acid in 0.4 ml. H$_2$O, and the mixture is chilled over night. The crystalline bitartrate salt is filtered off and dried in vacuo. It may be recrystallized from ethanol, double M.P. 166° and 203–5° (dec.).

EXAMPLE 8

16-piperidino pregnenolone-3-veratrate

Veratroylchloride (1 g.) and 1.0 g. of 16-piperidino pregnenolone are dissolved in 8 ml. of dry pyridine and stirred at 50–60° C. for 2 hours, and then allowed to stand over night at room temperature. The solution is poured into water (no precipitate) and let stand for 2 hours. Then 10% Na$_2$CO$_3$ is added to make the pH 8–9. The precipitated 16-piperidino pregnenolone-3-veratrate is filtered off and washed with water. The crude product may be crystallized from ethanol, m.p. 154–6°. In the same manner, other esters may be prepared, such as the acetate, 176–8°, propionate, benzoate, isobutyrate, M.P. 140–1° methyl ethyl acetate, etc.

EXAMPLE 9

16-piperidino pregnenolone-3-veratrate hydrochloride

A sample of the product of Example 8 is dissolved in benzene and treated with an absolute ethereal solution containing a 10% excess of hydrogen chloride. The mixture is concentrated by bubling N$_2$ through it. The precipitated 16-piperidino-pregnenolone-3-veratrate hydrochloride is filtered off and may be recrystallized from ethanol, M.P. 244–245° (dec.)

EXAMPLE 10

*16-piperidino pregnenolone-3-veratrate bitartrate*

A sample of the product of Example 8 is dissolved in hot acetone and treated with a 50% aqueous solution of d-tartaric acid (1.05 equivalents). The mixture is chilled over night and filtered off. The product, 16-piperidino-pregnenolone-3-veratrate bitartrate, may be recrystallized from ethanol.

EXAMPLE 11

*16-(N-piperidino)-5-pregnen-3β,20-diol*

Four grams of 16-piperidinopregnenolone are dissolved in 40 ml. of methanol and treated with 4 g. of sodium borohydride. The mixture is allowed to stand 4 hrs. until no further bubbling occurs, and is then decomposed with acetone. The mixture is poured into water and the precipitated 16-(N-piperidino)-5-pregnen-3β,20-diol is filtered off. It may be recrystallized from isopropanol, M.P. 184–186°. The hydrochloride has a M.P. of 292–293° (dec.).

EXAMPLE 12

*16-(N-piperidino) allopregnan-3β-ol-20-one*

16-piperidinopregnenolone is dissolved in 20 volumes of acetic acid and reduced by shaking in a hydrogen atmosphere with 0.25 part of 10% palladium on charcoal. The hydrogen equivalent to one double bond is absorbed, the reduction is stopped and the mixture is filtered and neutralized with 10% $Na_2CO_3$. The precepitate is filtered, dried, and recrystallized from dilute alcohol. The product is 16-(N-piperidino)-allopregnan-3β-ol-20-one, M.P. 169–171°.

EXAMPLE 13

*16-piperidino pregnenolone-3-glucoside acid maleate*

Five grams of 16-dehydropregnenolone in 200 ml. of benzene are heated with stirring with 8 g. of dry fresh silver carbonate. To this is added dropwise with stirring a solution of 10 g. of tetraacetobrom glucose in 200 ml. of benzene, and a quantity of benzene equivalent to the added solution is distilled off. The mixture is boiled ½ hr. longer and filtered through a clarifying mat. The mother liquor is concentrated to dryness and the syrupy residue crystallized from ether. The product is 16-dehydropregnenolone-3-glucoside-tetraacetate.

A sample of this is treated with piperidine as in Example 4, using 1 part of KOH in 1 volume of water, to hydrolyze the acetate groups and act as a catalyst. The mixture is concentrated to a small volume in vacuo below 40° C. This is treated with one equivalent of maleic acid in 2 volumes of methanol. The mixture is chilled and the product, 16-piperidine pregnenolone-3-glucoside acid maleate, is filtered off. The free base is regenerated by dissolving in methanol, treating with one equivalent of $K_2CO_3$ in water and methyl ethyl ketone while distilling off methanol. The precipitate obtained on cooling is filtered off and recrystallized from acetone-methanol. The melting range is indeterminate, 172–195° (dec.), but the structure is confirmed by infra-red spectrum.

EXAMPLE 14

*16-(N-piperidino) allopregnan-3β-ol-20-one*

2 g. of 16-dehydro-allopregnane-3β-ol-20-one-acetate are treated as in Example 8. The precipitate obtained on pouring into water is 16-piperidino-allopregnanolone, the same product as obtained in Example 12.

EXAMPLE 15

*16-(N-γ-pipecolino) pregnenolone*

Example 5 is repeated, using γ-pipecoline in place of β-pipecoline. The product obtained on water precipitation is 16-γ-pipecolino-pregnenolone which is not a mixture of isomers. The crude product may be purfied by a crystallization from benzene, M.P. 169–171°, and the structure is confirmed by infra-red spectrum.

EXAMPLE 16

*16-(N-γ-pipecolino) pregnenolone-3-acetate*

The product from Example 15 is treated with one part of acetic anhydride in dry pyridine and stirred at 56–60° C. for two hours. The mixture is poured into water and the pH adjusted to 8–9 with 10% sodium carbonate. The precipitate is crude 16-gamma-pipecolino-pregnenolone-3-acetate which may be recrystallized from methanol.

EXAMPLE 17

*16-(N-piperidino) pregnenolone methyl iodide*

Four grams of the compound from Example 4 are suspended in 25 ml. of benzene and 8 ml. of methanol. The mixture is treated with 3.5 ml. of methyl iodide and refluxed for one hour. The mixture is cooled, and the solid filtered off, washed with benzene and dried in vacuo. M.P. 265–268° (dec.). Upon recrystallization from methanol-benzene, M.P. 271.5–272.5° (dec.); $[\alpha]_D^{27}+18.4°$ (95% EtOH).

EXAMPLE 18

*16-piperidino-5-pregnen-3,21-diol-20-one*

One gram of 5,16-pregnadien-3,21-diol-20-one diacetate is treated as in Example 4. The product obtained by water precipitation is crystallized from ethyl acetate and the structure is confirmed by the infrared spectrum. The hydrochloride is prepared by treatment of the benzene solution with ethereal hydrogen chloride.

EXAMPLE 19

*16-piperidino-allopregnane-3,20-diol*

The product of Example 11 (24 g.) is dissolved in 100 ml. of acetic acid and shaken with 2 g. of platinum oxide under hydrogen until absorption ceases. The mixture is filtered and the filtrate poured into 2 ml. of water containing 250 g. of KOH. The precipitate is collected and refluxed in 700 ml. of methanol with 12 g. of KOH in 50 ml. of water for 1½ hours. The solution is concentrated to a low volume, and diluted with water. The precipitated product is collected on a filter and dissolved in benzene and the benzene layer concentrated, yielding crystals of M.P. 178–179°. Recrystallization from benzene and also from acetone did not materially alter the melting point of the product. The infrared spectrum shows peaks at 2.80 and 3.12.

Concentration of an acetone mother liquor yields a second form, M.P. 185–190°, $[\alpha]_D$ —57.0, differing slightly as expected in the infrared spectrum with a peak at 3.12 and a shoulder at 2.96.

While we have hereinabove described the use of 20-keto-16-dehydro pregnanes as starting compounds, other 16-dehydro steroids may be employed which have at the 17-position a group containing a multiple bond attached to an electronegative atom and in conjugated relation to the 16,17-double bond, such group being one which can be built up or degraded to the radical $CH_2(R)$—CO—. Examples of such groups are nitrile, carboxy and carbalkoxy, like carbomethoxy.

As indicated above, the compounds of the invention include pregnane compounds having, in addition to the substituents at the 3- and 20-positions, also one or more hydroxyl groups at the 2, 5, 6, 7, 11 and 12-positions. Methods for introducing such hydroxyl groups are known, while compounds having hydroxyl groups in the 7- and 12-positions are obtainable also by the side-chain degradation of bile acids. Typical of such compounds are 6-hydroxy-16-(N-piperidino) pregnanolone; 7,12-dihydroxy-16-(N-β-pipecolino)-pregnenolone; 16-(N-morpholino)-pregnentriol-3,12,20; 16-(N-piperidino)-allopregnan-3,5,6,20-tetrol; and 16-(N-β-pipecolino)-3,11,20-triketo-pregnanol-21.

A number of instances of the use of alkyl-substituted cyclic amines are presented in the above examples. Further examples of products obtained with alkyl-substituted cyclic amines are 16-(N-β,β-dimethylpiperidino)-pregnenolone; 16-(N-3-ethyl-meta-thiazolidino)-pregnendiol; 16-(N-5-methylhexahydropyrimidino)-pregnandiol-3-acetate hydrochloride, and 16-(N-3-5-diethyl-piperidino)-pregnenolone-3-acetate bitartrate.

We claim:
1. 16-(N-piperidino)-5-pregnen-3-ol-20-one.
2. 16-(N-β-pipecolino)-5-pregnen-3-ol-20-one.
3. 16-(N-β-pipecolino)-5-pregnen-3,20-diol.
4. 16-(N-piperidino)-5-pregnen-3,20-diol.
5. 16-(N-pyrrolidino)-5-pregnen-3-ol-20-one.
6. 16-(N-pyrrolidino)-Δ$^5$-pregnen-3-ol-20-one.
7. 16-(N-morpholino)-Δ$^5$-pregnen-3-ol-20-one.
8. 16-(N-piperidino)-allopregnan-3-ol-20-one.
9. Process for the manufacture of 16-N-substituted steroids which comprises reacting a member of the class consisting of pregnene and pregnadiene compounds having in the 3-position a member of the group consisting of OH, O-acyl and O-glucosidyl, the acyl radical being of a member of the class consisting of aliphatic and aryl carboxylic acids having from 1 to 9 carbon atoms, the pregnene compounds having 16,17-double bond and the pregnadiene compounds having also a double bond between the 5 and 6-carbons, said compounds having also a keto group in the 20-position, with a saturated heterocyclic compound having 5 to 6 atoms in the ring, of which one is nitrogen, at most one other atom being a member of the group consisting of nitrogen, oxygen, and sulfur, the remaining atoms being carbon, until the heterocycle becomes linked to the 16-carbon through ring nitrogen.
10. Process according to claim 9, wherein the reaction takes place in the presence of a basic catalyst.
11. Process according to claim 9, including the further step of reducing the 20-keto group to a secondary alcohol group.

12. A compound of the class consisting of (1) nuclearly saturated and unsaturated pregnanes of the formulas

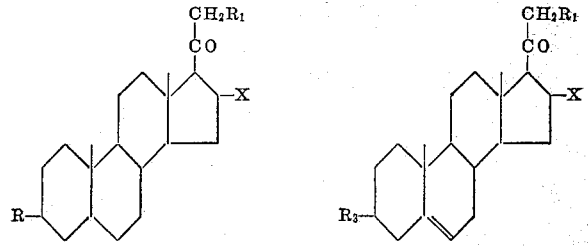

wherein X is a member of the group consisting of saturated heterocyclic radicals having 5 to 6 atoms in the ring, of which one is nitrogen by which it is linked to the 16-carbon, the remaining atoms being carbon, and saturated heterocyclic radicals having 5 to 6 atoms in the ring, one of which is nitrogen, by which it is linked to the 16-carbon, one other atom being a member of the group consisting of nitrogen, oxygen and sulfur, the remaining atoms being carbon; while R is a member of the group consisting of ketonic oxygen, hydroxyl, an alkanoyloxy group of 1 to 9 carbon atoms, an aroyloxy group of 7 to 9 carbon atoms, and the glucosidyl radical; $R_1$ is a member of the group consisting of hydrogen, hydroxyl, an alkanoyloxy group of 1 to 9 carbon atoms, and an aroyloxy group of 7 to 9 carbon atoms; and $R_3$ is a member of the group consisting of hydroxyl, an alkanoyloxy group of 1 to 9 carbon atoms, an aroyloxy group of 7 to 9 carbon atoms, and the glucosidyl radical; (2) their acid addition salts; and (3) their lower alkyl and benzyl iodide, bromide and chloride addition salts.

13. A pregnane compound as defined in claim 12, wherein X is a piperidyl radical.

14. A pregnane compound as defined in claim 12, wherein X is morpholyl.

15. A pregnane compound as defined in claim 12, wherein X is beta-piperidyl.

References Cited in the file of this patent
UNITED STATES PATENTS
2,750,380    Dodson et al. _____ June 12, 1956

OTHER REFERENCES

Fieser and Fieser: Natural Products Related to Phenanthrene (3rd edition 1949), Reinhold Publishing Corporation, New York, page 425.